Patented Feb. 6, 1945

2,368,660

UNITED STATES PATENT OFFICE 2,368,660

COMPOSITION OF MATTER FOR FLAMEPROOFING CELLULOSIC MEDIA AND METHOD OF MAKING THE SAME

Frederick W. Hochstetter, Pittsburgh, Pa., assignor to Hochstetter Research Laboratories, Inc., Pittsburgh, Pa., a corporation of Pennsylvania No Drawing. Application November 3, 1941, Serial No. 417,745

9 Claims. (Cl. 106—15)

My present invention relates to the art of flameproofing; more particularly, to a composition of matter for flameproofing cellulosic or ligno-cellulosic media or products fabricated therefrom as well as to a method for producing such composition.

The art of flameproofing is exceedingly old and well known. Many proposals have been made in the prior patents and literature for imparting flameproof or fireproof characteristics to cellulose and cellulosic materials. It is widely recognized, however, that all proposed formulas are defective or deficient in one or more particulars. Many of them give off noxious fumes or merely act to retard combustion; others are expensive, difficult to make or apply and effective, if at all, only for a limited period; still others permit after-glow and give off large quantities of smoke. There is, so far as I am aware, no known flameproofing composition which really meets commercial requirements satisfactorily and which will not disadvantageously affect the materials treated. The desirability and need for an effective composition that will reduce fire hazards and losses, decrease insurance rates, etc. is, of course, obvious.

It is, accordingly, one of the objects of my present invention to produce a flameproofing composition of matter which will obviate the defects and disadvantages of known compositions.

Another object of my invention is to produce a composition capable of imparting adequate flameproof characteristics to cellulosic media and products both in the form of pulp and fibres or semi-finished and finished materials.

A further object of my invention resides in a composition which, when applied to cellulosic materials, shall render the same flameproof, retaining its flameproof characteristics even under unusually high temperature conditions and even after repeated washings.

Materials treated with my new composition do not give off appreciable smoke and are free from after-glow both during and subsequent to subjection to a flame or fire; they do not support combustion but will, at most, merely char; such constitute further objects of my invention.

More specifically, my invention includes the use of hexamethylenetetramine and/or saligenin in combination in a flameproofing composition.

A still further object includes procedure for making my new composition.

Other and further objects and advantages will be understood by those skilled in this art or will be apparent or pointed out hereinafter.

My present invention is based upon the discovery that the use of hexamethylenetetramine $C_6H_{12}N_4$ (urotropine) in combination in a flameproofing composition not only imparts greater permanency of flameproof characteristics to the media or products treated therewith but also has antisepticizing qualities of value thus preventing molding, decay, etc., caused by bacteria, spores or other micro-organisms as well as rendering the products verminproof. This is of especial benefit in treated mattresses, pillows, etc.

I have further discovered that by utilizing aqueous saligenin $HO.C_6H_4.CH_2OH$ (oxybenzylalcohol) in my flameproofing composition, particularly when used in conjunction with hexamethylenetetramine, the flameproofing characteristics of the composition are so improved or altered that the media or products treated therewith can be subjected to repeated washings without loss of flameproofing quality. Flameproofed products can thus be produced which are washproof and non-leaching.

In a composition for flameproofing which contains both hexamethylenetetramine and saligenin, in accordance with my present invention, I believe that there is a compound precipitated in or upon the cellulose of the medium or product treated therewith which is in the nature of a polymer or partial condensation product, chemically short of a solid end-product, which is permanent and non-hardening and which effectively resists repeated washings, probably also being resistant to the solvent action of water as well as to soaps, washing compounds and the like. In combination with the other hereinafter specified ingredients of my new composition, which may take a number of specific forms, an unusually efficacious flameproofing is achieved which is far superior to results hitherto attained as indicated by extensive tests and investigations made by me.

The following exemplary formulas have been found by me to achieve the objects and advantages herein set forth.

Example 1

| | Parts by weight |
|---|---|
| Aqueous protein (1–10%) | About 100 |
| Hexamethylenetetramine | About 1–10 |
| Sulphuric acid (66%) | About 1–20 |
| Aqueous ammonia (28%) | About 3–60 |
| Phosphoric acid (commercial) | About 1–10 |

Example 2

100 parts water, containing 1–10 parts nitrogenous matter by weight 1-10 parts of hexamethylenetetramine in 100 parts water by weight
5-25 parts sulphuric acid (66%) in 60 parts water by weight
15-65 parts ammonia (28%) in 60-100 parts water by weight
5-10 parts phosphoric acid (commercial) in 100 parts water by weight

*Example 3 (by weight)*

| | Parts |
|---|---|
| Water | 100 |
| Nitrogenous matter (derived from casein or animal colloid) | 5-10 |
| Sulphuric acid (66%) | 5-25 |
| Ammonia (aqua) (28%) | 15-50 |
| Phosphoric acid (commercial) | 5-10 |
| Hexamethylenetetramine | 1-5 |
| Aqueous saligenin (saturated solution) | 1-2 |

*Example 4 (by weight)*

| | Parts |
|---|---|
| 2% aqueous solution of animal colloid | 100 |
| Ammonium sulphate | 5-10 |
| Ammonium phosphate | 1-5 |
| Ammonium carbonate | 1-5 |
| Borax | 1-5 |
| Boric acid | 1-5 |
| Hexamethylenetetramine | 1-10 |

In preparing the composition of Example 1, the ingredients are added in the order given following the temperatures prescribed in connection with Example 2, so far as applicable. The aqueous protein extract may be prepared by adding protein to water which has been boiling for about 20 minutes. The ingredients interact to form both primary and secondary reaction products of a complex nature, the resultant composition acting to impart all the above desired characteristics to cellulosic media and products.

In compounding Example 2, the desired amount of water is boiled for about 20 minutes and casein, glue or gelatine added. When casein is used it is first dissolved in the ammonia ingredient. When glue or gelatine is used it is first softened in cold water and finally cooked for twenty minutes. As soon as the ammonia is added to the casein and stirred in a closed vessel the phosphoric acid constituent is added slowly until a syrupy condition is reached. Thereupon the aqueous nitrogenous constituent at a temperature of about 60° F. is added and thoroughly stirred and then the sulphuric acid added slowly while preventing the temperature from rising above about 60° F. Finally, the hexamethylenetetramine is added and the temperature gradually raised to about 120° F., or above if necessary to keep the mixture fluid.

Examples 3 and 4 are compounded as per Example 1.

In connection with all formulas under this invention adjustment may be made so that the composition as a whole is alkaline, neutral or acid. I have discovered that this flexibility is important because various media and products can only be adequately flameproofed by compositions of certain pH values. In this manner, too, my compositions can be more widely applied with efficaciousness.

The above examples are intended as illustrative and not as an exhaustive summation of the invention which is rather to be defined by the subjoined claims. Other variations and modifications may be resorted to within the spirit and scope of the invention. In one or another of its forms my composition is widely applicable to cellulosic media and products in which flameproofing characteristics are desired. Such may, for example, include mattresses, pillows, cushions and upholstery of various kinds, both the cotton or fibrous fillers and the coverings or tickings thereof; insulating materials such as are used in automobiles and airplanes; clothing, rugs, curtains, draperies, linens and many other materials. The invention may be used to treat the pulp or fibres prior to the making up of media and products therefrom.

I have further discovered that the incorporation of hexamethylenetetramine and/or saligenin in known flameproofing compositions greatly improves the effectiveness of such compositions to a marked extent.

What I claim is:

1. An aqueous composition of matter of the character described, which is capable of converting inflammable cellulosic materials to a non-inflammable condition and which is essentially composed of the reaction product of hexamethylenetetramine and oxybenzylalcohol.

2. A washproof and non-leaching, non-combustible and non-inflammable cellulosic article of commerce which is composed of a cellulosic material normally combustible and inflammable, combined with the products of reaction of hexamethylenetetramine and oxybenzylalcohol to which has been added a dilute protein extract in colloidal form.

3. A flameproofing composition of matter consisting of the reaction products and unreacted residues of:

About 100 parts by weight of aqueous protein extract (1-10%);
About 1-10 parts by weight of hexamethylenetetramine;
About 1-20 parts by weight of 66% sulphuric acid;
About 3-60 parts by weight of 28% aqueous ammonia; and
About 1-10 parts by weight of commercial phosphoric acid.

4. A flameproofing composition of matter consisting of the reaction products and unreacted residue of:

100 parts by weight of water containing 1-10 parts protein;
About 1-10 parts of hexamethylenetetramine in 100 parts by weight of water;
About 5-25 parts of 66% sulphuric acid in 60 parts of water, by weight;
About 15-65 parts of ammonia (28%) in 60-100 parts of water, by weight; and
About 5-10 parts of commercial phosphoric acid in 100 parts of water, by weight.

5. A flameproofing composition of matter consisting of the reaction products and unreacted residues of:

100 parts of water, by weight;
5-10 parts of nitrogenous matter derived from casein or gelatine;
5-25 parts of sulphuric acid;
15-50 parts of ammonia (aqua);
5-10 parts phosphoric acid;
1-5 parts hexamethylenetetramine and
1-2 parts oxybenzylalcohol.

6. A flameproofing composition of matter consisting of the reaction products and unreacted residues of:

100 parts 2% aqueous gelatine extract;
5-10 parts ammonium sulphate;
1-5 parts ammonium phosphate;
1-5 parts ammonium carbonate;
1-5 parts borax;
1-5 parts boric acid; and
1-10 parts hexamethylenetetramine.

7. A method of making a flameproofing composition comprising adding 1-10 parts casein to 15-65 parts aqua ammonia, mixing the same with water out of contact with the air, adding 5-10 parts phosphoric acid, adding 5-25 parts concentrated sulphuric acid while preventing a temperature rise above about 100° F. adding 1–10 parts hexamethylenetetramine and gradually raising the temperature to about 120° F.

8. A method in accordance with claim 7 wherein casein is replaced by equivalent amounts of glue or gelatine which has been previously softened in cold water and cooked for about twenty minutes.

9. A composition of matter for flameproofing cellulosic media which contains an appreciable proportion of a semi-solid condensation product of hexamethylene tetramine and oxybenzylalcohol.

FREDERICK W. HOCHSTETTER.